United States Patent [19]

Suzuki et al.

[11] Patent Number: 5,091,434
[45] Date of Patent: Feb. 25, 1992

[54] POLYOL COMPOSITION AND METHOD FOR PRODUCING A RIGID POLYURETHANE FOAM USING THE SAME

[75] Inventors: Masahiro Suzuki; Ichiro Kamemura, both of Yokohama; Hiromitsu Kodaka, Mitaka, all of Japan

[73] Assignee: Asahi Glass Company Ltd., Tokyo, Japan

[21] Appl. No.: 613,745

[22] PCT Filed: Apr. 6, 1990

[86] PCT No.: PCT/JP90/00465
§ 371 Date: Dec. 6, 1990
§ 102(e) Date: Dec. 6, 1990

[87] PCT Pub. No.: WO90/12047
PCT Pub. Date: Oct. 18, 1990

[30] Foreign Application Priority Data

Apr. 7, 1989 [JP] Japan ................... 1-86904

[51] Int. Cl.$^5$ .............................. C08G 18/14
[52] U.S. Cl. ................... 521/78; 521/131; 521/167; 521/107; 252/182.26; 427/244; 427/245; 427/255.6
[58] Field of Search ............. 521/78, 131, 167, 107; 252/182.26; 427/244, 245, 255.6

[56] References Cited

U.S. PATENT DOCUMENTS 3,112,281 11/1963 Gromacki et al. ............. 250/2.5
4,585,807 4/1986 Christman ...................... 521/78

FOREIGN PATENT DOCUMENTS 0002768 11/1979 European Pat. Off. .
1233862 10/1960 France .

*Primary Examiner*—Maurice J. Welsh
*Attorney, Agent, or Firm*—Oblon, Spivak, McClelland, Maier & Neustadt

[57] ABSTRACT

The present invention relates to a polyol composition used to produce a rigid polyurethane foam by a spraying method and also to a method for producing a rigid polyurethane by a spraying method using the composition.

The polyol composition of the present invention is characterized by comprising a polyol mainly composed of an ethylenediamine-alkylene oxide addition polyol and a smaller amount of a halogenated hydrocarbon blowing agent and a larger amount of water than in the production of rigid polyurethane foams by a known spraying method. More particularly, the polyol composition of the present invention comprises a polyol containing not less than 45% by weight of an ethylenediamine-alkylene oxide addition polyol and having an average hydroxyl value of 250-550, and a blowing agent comprising not more than 45% by weight of a low boiling halogenated hydrocarbon blowing agent and 1-6 parts by weight of water, per 100 parts by weight of said polyol.

12 Claims, No Drawings

POLYOL COMPOSITION AND METHOD FOR PRODUCING A RIGID POLYURETHANE FOAM USING THE SAME

DESCRIPTION

1. Technical Field

The present invention relates to a polyol composition for rigid polyurethane foams which has good adhesion to low temperature substrates and which is able to considerably reduce the amount of a specific type of from and also to a method for producing rigid polyurethane foams, and more particularly, to a polyol composition which is adapted for making a rigid polyurethane foam capable of spray foaming in place and a method for producing a rigid polyurethane foam using the same.

2. Technical Background

In polyol compositions which are employed for producing heat-insulating polyurethane foams applied by in-place foaming, it is usual to use, as a blowing agent, R-11 (trichloromonofluoromethane) and water. However, R-11 has the possibility of depleting the ozone layer in the stratosphere to adversely influence the living system. In a near future, limitation will be placed on its amounts in use and production.

Accordingly, in the field of urethane foaming, it will become necessary to appreciably reduce the amount of R-11. Under these circumstances, it is considered that the amount of water which is a component of the blowing agent is increased with a reduction in amount of R-11. In the production of rigid polyurethane foams according to a known spraying method, R-11 has been used in 55–70 parts by weight per 100 parts by weight of polyol. This amount has to be reduced in the future.

However, attention should be paid to the fact that in spray foaming, a mixing ratio of the polyol-based composition (stock solution) and a polyisocyanate compound is required to be within a range suitable for spraying machines in view of the structure of the machine. In known spraying compositions, if R-11 is merely reduced in amount with an increase in amount of water, the mixing ratio is so shifted or the average hydroxyl value in the polyol based composition is so increased that the amount of the polyisocyanate compound to be used becomes too excessive, making it difficult to perform spray foaming with use of the machine.

Moreover, more increase in amount of water involves problems that the resultant foam becomes brittle with a considerable lowering of adhesion to low temperature substrates, so that the foam may separate or fall off from the substrate or may be lifted owing to a phenomenon called transverse spreading immediately after the spraying, coupled with another problem that with spraying in a large thickness, scorching is apt to occur, thus making the practical application impossible.

It will be noted that the low temperature substrate means a substrate of low temperatures at the time of inplace foaming in cold districts (e.g. walls of buildings). For the in-place foaming, the substrate at an ambient temperature is usually sprayed and a foam with good quality has to be formed not only at normal temperatures, but also at lower temperatures (e.g. $-5°$ C. to $5°$ C.).

In spray blowing polyol composition wherein water used as a foaming agent is formulated in amounts larger than in conventional ones, the average hydroxyl value of the total polyols has to be lowered.

In order to totally lower the hydroxyl value of the polyol mixture, it may occur that high molecular weight polyols ordinarily used to produce a flexible polyurethane foam or polyols with a reduced number of functional groups and a low hydroxyl value are formulated. This presents the problem that a cured foam is liable to suffer shrinkage under low temperature conditions.

DISCLOSURE OF THE INVENTION

An object of the present invention is to overcome the problems involved in the case where the amount of water as a blowing agent is increased while low boiling halogenated hydrocarbon foaming agents, such as R-11 (trichloromonofluoromethane), used as a blowing agent of starting materials for in-place spray foaming urethane foams are considerably reduced in amount, e.g. problems such as extreme brittleness of the resulting foam, a failure in adhesion to low temperature substrates, and shrinkage of the foam at a low temperature. The present invention resides in a polyol composition and a method for producing a rigid polyurethane foam using the composition as defined below.

A polyol composition which comprises a polyol having not less than 45% by weight of an ethylenediaminealkylene oxide addition polyol and an average hydroxyl value of 250–550, a blowing agent comprising not more than 45 wt % of a low boiling halogenated hydrocarbon blowing agent and 1–6 parts by weight of water, each per 100 parts by weight of said polyol, and additives such as a foam stabilizer and a catalyst, and which is used to produce rigid polyurethane foams by being mixed with polyisocyanate compounds according to a spraying method.

A method for producing a rigid polyurethane foam characterized by mixing the above polyol composition with a polyisocyanate compound by a spraying method, and spraying the mixture on a substrate on which the mixture is foamed and cured to form a rigid polyurethane foam adhered to the substrate.

The ethylenediamine-alkylene oxide addition polyol (hereinafter referred to as ethylenediamine-based polyol) used in the present invention and obtained by reaction between ethylenediamine and an alkylene oxide is known per se as a starting polyol for rigid polyurethane foam. The alkylene oxide is preferably an alkylene oxide having 2–4 carbon atoms, i.e. ethylene oxide, propylene oxide, 1,2-butylene oxide and 2,3-butylene oxide. More preferably, propylene oxide or propylene oxide and ethylene oxide are used. Where propylene oxide and ethylene oxide are used in combination, it is preferred that propylene oxide is first reacted and then, ethylene oxide is reacted. The amount of addition of the alkylene oxide is in the range of from 4 mols per mol of ethylenediamine to an amount sufficient to provide the following hydroxyl value.

In the practice of the invention, the ethylenediamine-based polyol-comprises one or more polyols having a hydroxyl value of 200–800 and the average hydroxyl value is preferably in the range of 250–550. Especially, the hydroxyl value of the main ethylenediamine-based polyol is preferably 300–500. When used in combination with other polyols described hereinafter, the ethylenediamine-based polyol should preferably have a hydroxyl value within the above range. Where a mixture of two or more ethylenediamine-based polyols having different hydroxyl values is used, some of the ethylenediamine-based polyols should preferably have a hydroxy value exceeding 550.

The amount of the ethylenediamine-based polyol used as an essential component in the present invention is not less than 45 wt %, preferably not less than 55 wt % and more preferably not less than 60 wt%, of the total amount of polyols used in view of the adhesion to low temperature substrate. The polyols used may comprise one or more of the ethylenediamine-based polyols.

The ethylenediamine-based polyols used in the present invention may be used by mixing with other polyols. Other polyols include polyether polyols, polyhydric alcohols, polyester polyols and the like. Preferable polyether polyols include those polyether polyols obtained by addition reaction of alkylene oxides with initiators such as polyhydric alcohols, saccharides, polyhydric phenols, Mannich adducts and the like. For example, there are mentioned-polyether polyols obtained by adding alkylene oxides having 2-4 carbon atoms to initiators of one or more of ethylene glycol, propylene glycol, glycerine, trimethylolpropane, pentaerythritol, dextrose, sorbitol, sucrose, bisphenol A, bisphenol F, and Mannich adducts (e.g. phenols-alkanolamineformaldehyde condensates). The hydroxyl values of these other polyols are not critical. If the amount is relatively large, polyols having a hydroxyl value of 100-800 are used. The amount should be not larger than 55 wt % as stated before. The hydroxyl value and the amount should be determined such that the average hydroxyl value of the total mixture with the ethylenediamine-based polyols is from not less than 250 to not more than 550. A preferable average hydroxyl value of the total polyols is in the range of 300-550, more preferably 400-500.

The rigid polyurethane foam is obtained by providing the above-described polyols and polyisocyanate compounds as basic starting materials and reacting both compounds. In general, aside from the basic starting materials, various additives should be used. Essential additives generally include foam stabilizers, catalysts and blowing agents. In addition, optional additives include, for example, flame retardants, fillers, stabilizers, viscosity depressants, colorants and the like. The foam stabilizer, catalyst and blowing agent are added to the polyol. Most of the optional additives are also added to the polyol. The polyol composition of the present invention is one which contains these additives.

It is preferred in view of the foam density that based on 100 parts by weight of the polyol, the amount of a low boiling halogenated hydrocarbon blowing agent is in the range of 45-1 parts by weight, especially 42-10 parts by weight, and the amount of water is 1-6 parts by weight, especially 1-5 parts by weight.

The low boiling halogenated hydrocarbon blowing agent includes, for example, halogenated alkanes such as trichloromonofluoroethane, dichlorodifluoromethane (R-12), dichloromonofluoromethane (R-21), 1,1-dichloro-2,2,2-trifluoroethane (R-123), 1,1-dichloro-1-fluoroethane (R-141b), methylene chloride and the like. These halogenated alkanes may be used in combination with small amounts of other blowing agents (e.g. hydrocarbons). Typically, trichloromonofluoromethane (R-11) and other halogenated alkanes are used in combination. Of these, R-11 is preferred.

As the foam stabilizer, there may be mentioned non-ionic surface active agents such as organopolysiloxane-polyoxyalkylene copolymers, silicone-glycol copolymers and the like.

The curing catalysts include amine catalysts such as triethanolamine, tetramethylhexamethylenediamine, triethylenediamine, bis(2-dimethylaminoethyl)ether and the like, metal catalysts such as dibutyl tin dilaurate, stannous octoate, lead octoate and the like, which may be used singly or in combination.

As the flame retardant, there may be mentioned halogen-containing phosphoric ester compounds such as, for example, tris(2-chloroethyl)phosphate, tris(2-chloropropyl)phosphate, tris(dichloropropyl)phosphate, ethylenebis(bischloroethyl phosphate), polyoxyethylenebis(bischloroethyl phosphate), chloroethyl phosphate oligomers and the like.

In the spraying method, there is usually adopted a method wherein the polyol composition is provided as one component and a polyisocyanate compound is provided as another component, and the two components are mixed or sprayed while mixing. In this connection, either of the components may be divided into two or more portions, followed by spraying in the form of three or more components in total. Although the polyol composition and the polyisocyanate compound may be reacted according to a prepolymer method or a quasi-prepolymer method, the reaction is ordinarily carried out by a one-shot method.

The polyisocyanate compounds used in the present invention are not critical and may be appropriately selected from those ordinarily employed in this art. Typical examples include aromatic polyisocyanate such as, for example, tolylene diisocyanate, diphenylmethane diisocyanate, crude diphenylmethane diisocyanate and the like, and aliphatic polyisocyanates such as, for example, hexamethylene diisocyanate, isophorone diisocyanate, dicyclohexylmethane diisocyanate and the like. Of these, the aromatic polyisocyanates are preferred. The amount is not less than 0.8 equivalents, preferably 0.9-1.3 equivalents, per equivalent of the polyol composition (total equivalent of the polyol and water).

The rigid polyurethane foam according to the invention is formed by in-place foaming by spraying. However, limitation is not placed on this, but foaming by spraying in plants other than the in-place foaming may be used. The rigid polyurethane foam is formed on a substrate on which it is foamed and cured, and is adhered to the substrate. The substrates include, for example, buildings, walls, ceilings, floors and the like of constructions, panels of constructions, and panels of cold storages and refrigerated cars.

EXAMPLE

Examples are described to illustrate the present invention.

Polyols used in Examples and Comparative Examples (Table 1) are as follows.

Polyol A: polyether polyol obtained by reacting propylene oxide (PO) and ethylene oxide (EO) with ethylene diamine in this order at a ratio by weight of PO/EO of 1/0.7 and having a hydroxyl value of 350 mg KOH/g.

Polyol B: polyether polyol obtained in the same manner as in polyol A (except that PO/EO=1/0.9) with a hydroxyl value of 400 mg KOH/g.

Polyol C: polyether polyol obtained in the same manner as in polyol A (except that PO/EO=1/1.2) with a hydroxyl value of 450 mg KOH/g.

Polyol D: polyether polyol obtained by reacting PO alone with ethylenediamine and having a hydroxyl value of 750 mg KOH/g.

Polyol E: polyether polyol obtained by reacting PO with sucrose and having a hydroxyl value of 350 mg KOH/g.

Polyol F: polyether polyol obtained by reacting PO alone with Mannich's adduct of nonylphenol-diethanolamine-formaldehyde and having a hydroxyl group of 450 mg KOH/g.

100 Part by weight of mixtures, indicated in the table, of the polyols were formulated with water, blowing agents indicated below, a silicone foaming stabilizer, a triethylenediamine solution (catalyst A), lead octylate (catalyst B), and tris(2-chloropropyl)phosphate (flame retardant) to prepare stock solutions which were polyol compositions for spraying. The polyol stock solutions and crude diphenylmethane diisocyanate (Crude MDI) were spray foamed by means of a Gasmer foaming machine at a mixing ratio by volume of 100:100 (ratio by equivalent of 1:1.05–1.1) on a gypsum board substrate which had been preliminarily cooled (−5° C.), followed by evaluation of low temperature adhesion between the foams and the substrate. The types and compositions of starting materials (all amounts being by weight), the density and compressive strength of the resultant foams, and the adhesion of the foams to the low temperature substrate are shown in the following Table.

The foaming conditions were as follows.
Liquid temperature: 40° C.
Cream time: 2 seconds
Rise time: 10 seconds
Employed blowing agents (ratio by weight)
Blowing agent A: R-11
Blowing agent B: R-11/methylene chloride/normal pentane=85/5/10
Blowing agent C: R-11/methylene chloride/iso-pentane =84/6/10
Blowing agent D: R-123
Blowing agent E: R-141b
Blowing agent F: R-11/R-123 =50/50
Blowing agent G: R-11/R-141=50/50
Blowing agent H: R-123/R-141=50/50

We claim:

1. A polyol composition for producing a rigid polyurethane foam by being mixed with a polyisocyanate compound by a spraying method, which comprises a polyol containing not less than 45% by weight of an ethylenediaminealkylene oxide addition polyol and having an average hydroxyl value of 250-550, a blowing agent comprising not more than 45% by weight of a low boiling halogenated hydrocarbon foaming agent and 1-6 parts by weight of water, per 100 parts by weight of said polyol.

2. The polyol composition according to claim 1, wherein the ethylenediamine-alkylene oxide addition polyol comprises two or more of ethylenediamine-alkylene oxide addition polyols and has an average hydroxyl value of 250-550.

3. The polyol composition according to claim 1, wherein the amount of the ethylenediamine-alkylene oxide addition polyol in the polyol is 55-100% by weight.

4. The polyol composition according to claim 3, wherein a polyol other than the ethylenediaminealkylene oxide addition polyol is additionally present as the polyol and is an alkylene oxide adduct of at least one compound selected from polyhydric alcohols, saccharides, polyhydric phenols and Mannich adducts.

5. The polyol composition according to claim 1, wherein the polyol composition further comprises a halogen-containing phosphoric ester type flame retardant.

6. A method for producing a rigid polyurethane foam characterized by comprising mixing and spraying, by a spraying method, (i) a polyol composition which comprises a polyol containing not less than 45% by weight of an ethylenediamine-alkylene oxide addition polyol and having an average hydroxyl value of 250-550, a blowing agent comprising not more than 45% by weight of a low boiling halogenated hydrocarbon blowing agent and 1-6 parts by weight of water, per 100 parts by weight of said polyol, with (ii) a polyisocyanate compound, and spraying the mixture on a substrate on which the mixture is foamed and cured, thereby forming a rigid polyurethane foam adhered to said substrate.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |
|---|---|---|---|---|---|---|---|---|---|---|---|---|---|
| Starting Materials | | | | | | | | | | | | | |
| Polyol (type and amount) | A: 80 D: 20 | B: 85 D: 15 | A: 70 D: 30 | A: 45 D: 25 E: 30 | A: 45 D: 25 E: 30 | A: 15 C: 20 D: 20 E: 45 | A: 15 C: 20 D: 20 E: 45 | A: 30 D: 20 E: 30 F: 20 | A: 15 C: 20 D: 20 E: 45 | A: 15 C: 20 D: 20 E: 45 | A: 15 C: 20 D: 20 E: 45 | A: 20 D: 20 E: 60 | A: 10 D: 30 E: 60 |
| (Average hydroxyl-value) | (430) | (450) | (470) | (450) | (450) | (450) | (450) | (450) | | | | (430) | (470) |
| Blowing agent (type and amount) | A: 40 | A: 42 | A: 33 | B: 35 | C: 35 | D: 45 | E: 35 | E: 35 | F: 44 | G: 36 | E: 38 | A: 40 | A: 33 |
| Water | 2.7 | 2.6 | 1.5 | 2.7 | 2.7 | 2.8 | 2.7 | 2.7 | 2.7 | 2.7 | 2.7 | 2.7 | 1.5 |
| Foaming stabilizer | 1.0 | 1.0 | 1.0 | 1.5 | 1.5 | 1.5 | 1.5 | 1.5 | 1.5 | 1.5 | 1.5 | 1.0 | 1.0 |
| Catalyst A | 3.0 | 3.0 | 2.0 | 3.0 | 2.7 | 3.3 | 2.9 | 2.9 | 3.4 | 3.1 | 3.2 | 3.0 | 2.0 |
| Catalyst B | 0.3 | 0.3 | 0.2 | 0.3 | 0.25 | 0.3 | 0.3 | 0.3 | 0.3 | 0.3 | 0.3 | 0.3 | 0.2 |
| Flame retardant | 10 | 10 | 16 | 10 | 10 | 10 | 10 | 10 | 10 | 10 | 10 | 10 | 16 |
| Crude MDI | 157.0 | 158.9 | 153.7 | 152.5 | 152.15 | 162.9 | 152.4 | 152.4 | 161.9 | 153.6 | 155.7 | 157.0 | 153.7 |
| Physical properties | | | | | | | | | | | | | |
| Core density (kg/m³) | 28.6 | 28.3 | 34.4 | 30.6 | 30.3 | 30.1 | 30.3 | 30.6 | 29.8 | 30.5 | 30.2 | 29.1 | 34.8 |
| Compressive strength (kg/cm²) // | 1.72 | 1.63 | 2.43 | 1.95 | 1.92 | 1.88 | 1.90 | 1.98 | 1.85 | 1.96 | 1.87 | 1.71 | 2.46 |
| Compressive strength (kg/cm²) ⊥ | 0.75 | 0.74 | 1.58 | 0.88 | 0.87 | 0.84 | 0.88 | 0.93 | 0.81 | 0.95 | 0.89 | 0.70 | 1.52 |
| Adhesion (kg/cm²) | 1.41 | 1.37 | 1.83 | 1.65 | 1.63 | 1.56 | 1.53 | 1.64 | 1.47 | 1.63 | 1.55 | 0.04 | 0.29 |

7. The method according to claim 6, wherein the ethylenediamine-alkylene oxide addition polyol comprises two or more of ethylenediamine-alkylene oxide addition polyols and has an average hydroxyl value of 250-550.

8. The method according to claim 6, wherein the amount of the ethylenediamine-alkylene oxide addition polyol in the polyol is 55-100% by weight.

9. The method according to claim 8, wherein a polyol other than the ethylenediamine-alkylene oxide addition polyol is additionally present as the polyol and is an alkylene oxide adduct of at least one compound selected from polyhydric alcohols, saccharides, polyhydric phenols and Mannich adducts.

10. The method according to claim 6, wherein the polyol composition further comprises a halogen-containing phosphoric ester flame retardant.

11. The polyol composition according to claim 1, further comprising a foaming stabilizer, a catalyst, or mixture thereof.

12. The method according to claim 6, wherein the polyol composition further comprises a foaming stabilizer, a catalyst, or mixture thereof.

* * * * *